Figure 1:
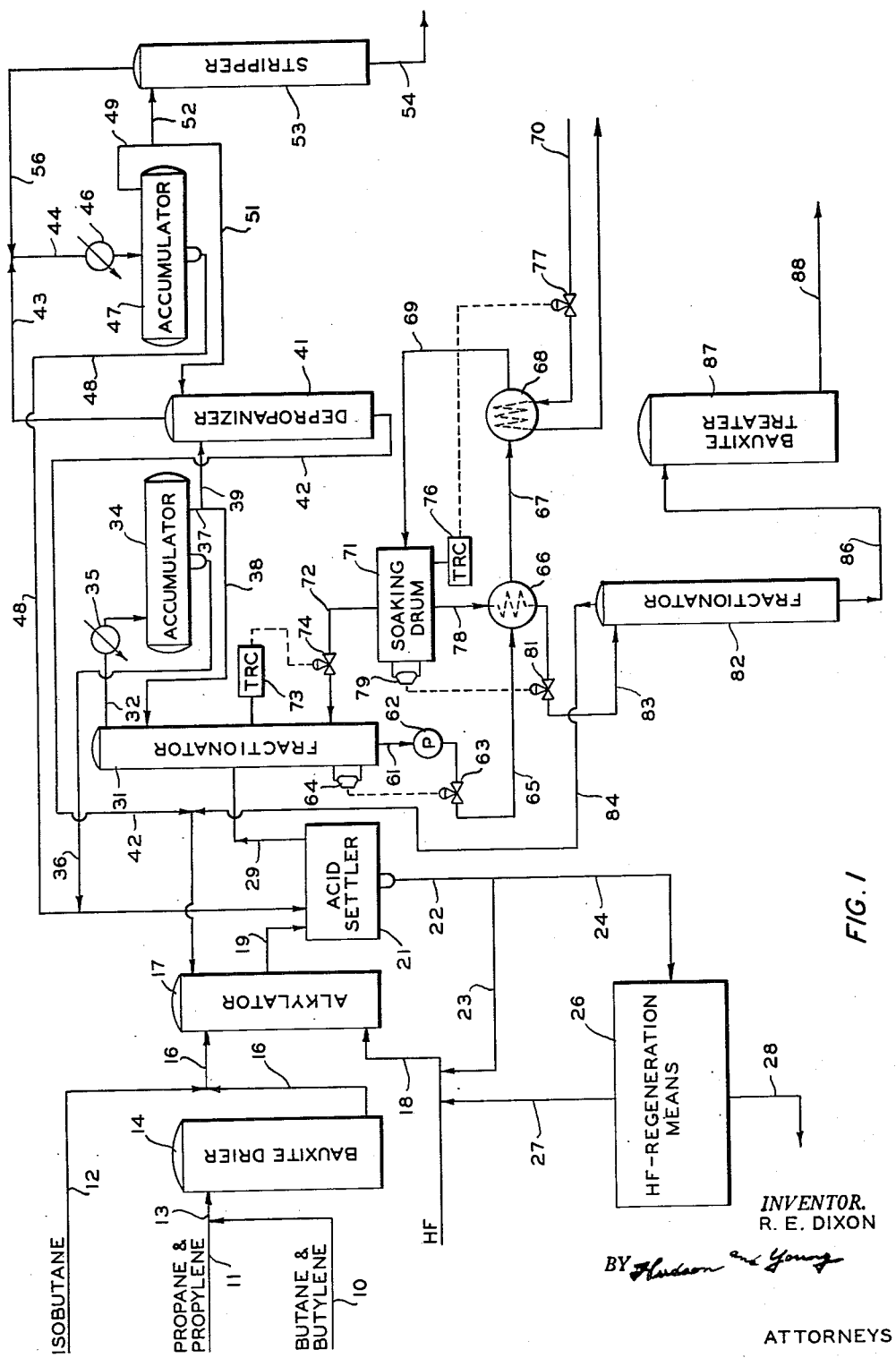

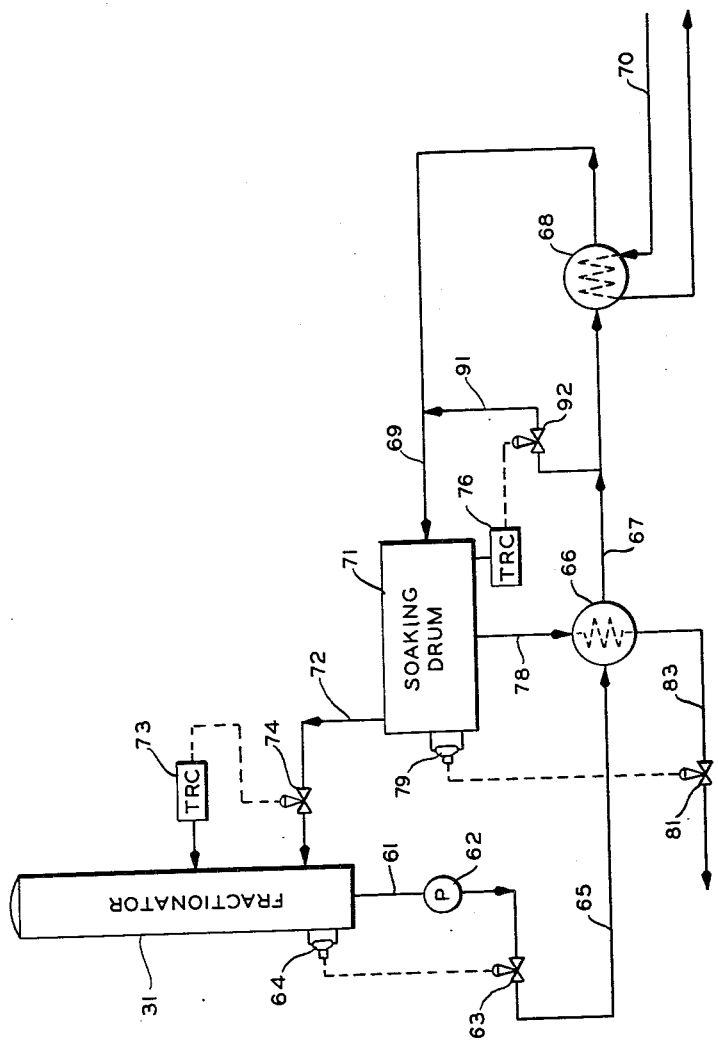

United States Patent Office 2,759,032
Patented Aug. 14, 1956

2,759,032

DEFLUORINATION OF REACTION PRODUCTS

Rolland E. Dixon, Bartlesville, Okla., assignor to Phillips Petroleum Company, a corporation of Delaware Application May 4, 1953, Serial No. 352,904

11 Claims. (Cl. 260—683.4)

This invention relates to the defluorination of the reaction products of conversion processes utilizing hydrofluoric acid as a catalyst. In one of its more specific aspects, this invention relates to the removal of hydrogen fluoride from the hydrocarbon phase of an alkylation process using hydrofluoric acid as a catalyst. In another of its more specific aspects, this invention relates to the recovery of hydrofluoric acid from an alkylate fraction comprising hydrocarbons and organic fluorine compounds. In still another of its more specific aspects, this invention relates to the thermal decomposition of the organic fluorine compounds contained in an alkylate fraction, and the use of the resulting vapors to furnish the reboiler heat for the primary fractionator in an alkylation process.

Concentrated or substantially anhydrous hydrofluoric acid is used as a catalyst in numerous organic reactions. For example, it is employed as a catalyst, alone or in admixture with minor amounts of a boron halide such as boron fluoride, in the conversion of hydrocarbons by alkylation, isomerization, disproportionation, and the like. It is also used as a refining agent and/or a selective solvent to remove materials such as organic fluorine compounds, sulphur compounds, and other non-hydrocarbon organic impurities from liquid hydrocarbon materials.

In the alkylation of low-boiling paraffinic hydrocarbons with alkylating reactants to form normally liquid paraffins having high octane numbers, hydrofluoric acid finds perhaps its most important use as a catalyst. In such alkylation processes, low-boiling paraffinic hydrocarbons, particularly isobutane and/or isopentane, and alkylating agents, particularly low-boiling olefins such as propylene, various butylenes, and/or various amylenes or the corresponding alkyl fluorides are intimately contacted in liquid phase at temperatures between about 50 and about 150° F. with liquid, concentrated hydrofluoric acid. The reaction periods range from about 0.2 to about 30 minutes, and thereafter the reaction effluents are passed to a settling zone for separation into a liquid hydrocarbon phase and a liquid acid phase. A large proportion of the liquid hydrofluoric acid phase from this settling zone is generally recycled to the reaction zone while some is withdrawn and subjected to purification for the removal of water and acid-soluble organic impurities. The hydrocarbon phase from the settling zone is generally subjected to fractional distillation to remove hydrogen fluoride dissolved therein, which is generally present to the extent of about 0.5 to about 3 per cent by volume, and to separate various hydrocarbon fractions which may comprise unreacted isobutane, unreacted normal butane and one or more alkylate fractions. This invention is primarily concerned with the removal of the hydrogen fluoride from the hydrocarbon phase and the defluorination of the alkylate fractions from the primary fractionator.

In the conventional alkylation process, the alkylate fraction recovered by the fractional distillation of the hydrocarbon phase is passed to a defluorination means for the removal of any organic fluorine compounds. This removal is generally affected by contact with a contact mass having catalytic hydrogenation and/or dehydrogenation properties, such as bauxite, alumina, alumina chromium oxide or similar material. In accordance with the present invention, the alkylate fraction from the primary fractionator is subjected to a temperature sufficiently high to decompose the organic fluorine compounds dissolved therein, and the resulting vapors containing hydrogen fluoride are used to furnish the reboiler heat to the primary fractionator. While the complete elimination of equipment for purifying the alkylate fraction is not necessarily contemplated, the practice of an alkylation process in accordance with this invention will materially increase the useful life of the contact mass material and will result in a considerable saving in the maintenance costs of the treaters. Furthermore, by using the vaporized hydrogen fluoride as described, the loss of hydrofluoric acid is considerably reduced.

The following objects will be attained by the various aspects of the invention.

It is an object of this invention to provide an improved method for the defluorination of the reaction products of hydrocarbon conversion processes utilizing hydrofluoric acid as a catalyst.

Another object of this invention is to provide an improved method and means for the defluorination of hydrofluoric acid alkylation products.

Still another object of this invention is to provide a method of defluorination in an alkylation process which results in an increase in recovery of the hydrofluoric acid catalyst.

A further object of this invention is to provide a method of defluorination in an alkylation process whereby the vapors containing hydrogen fluoride which result from the thermal decomposition of the organic fluorine compounds present in an alkylate fraction are used to supply the reboiler heat to the primary fractionator.

A still further object of this invention is to provide a method of defluorination in an alkylation process which will result in a material saving in the maintenance cost of the equipment for purifying the alkylate fraction.

Other objects and advantages of this invention will be apparent from the following description and the accompanying drawing in which:

Figure 1 illustrates diagrammatically by means of a flow diagram one arrangement of apparatus suitable for practicing my invention; and Figure 2 shows an alternative arrangement of apparatus suitable for practicing my invention.

While my invention can be employed advantageously in many modifications, it is especially applicable to the alkylation of low-boiling isoparaffins and low-boiling olefins in the presence of a liquid hydrofluoric acid catalyst. Referring to Figure 1 of the drawing, an alkylation process is illustrated which utilizes the present invention. A hydrocarbon feed is shown as entering the system through three lines, namely, butane and butylene through line 10, propane and propylene through line 11, and isobutane through line 12. It will be understood, however, that other charge stocks may be used. Those portions of the feed in lines 10 and 11 are combined in line 13 and introduced into bauxite drier 14 where any moisture contained therein is removed. Isobutane is combined in line 16 with the olefin-containing portions of the feed leaving bauxite drier 14, and the total feed is then introduced through line 16 into alkylator 17. Hydrofluoric acid catalyst is introduced into alkylator 17 through line 18 where it is intimately mixed with the hydrocarbon feed. A sufficient amount of isobutane is added, comprising fresh isobutane and recycled unreacted isobutane, so as to maintain the mol ratio of isobutane to olefins in the total feed between about 1.5:1 and 12:1, usually about 5:1. Enough of the hydrofluoric acid catalyst is introduced so that together with recycled acid and purified acid a ratio of hydrocarbon to acid catalyst will be between about 0.5:1 and 10:1 on a liquid volume basis. The reactants are intimately contacted with the acid catalyst in the alkylator at temperatures between about 50 and about 150° F. and at a pressure sufficient to maintain the reactants in a liquid phase for a residence time of from about 0.2 to about 30 minutes.

After a suitable contact period, the reaction mixture is passed from alkylator 17 through line 19 to acid settler 21 wherein a phase separation between a liquid hydrocarbon phase and a liquid hydrofluoric acid phase is readily obtained by settling. If the conversion carried out in alkylator 17 is at a temperature which does not permit a ready separation, suitable cooling means, not shown, may be provided in line 19 to lower the temperature of the mixture to a preferred range.

The heavier or hydrofluoric acid phase is withdrawn from settler 21 through line 22, and may be returned to alkylator 17 through lines 23 and 18. A desired portion of the used acid catalyst, generally somewhere within the range of about 1 to about 10 per cent by volume, may be passed from line 22 through line 24 to hydrofluoric acid-regeneration means 26 wherein it is separated into a relatively large light fraction and a relatively small heavy or oil fraction. The light fraction, comprising mainly hydrofluoric acid, dissolved isobutane and other low boiling hydrocarbons, and some low-boiling organic fluorine compounds is recycled through lines 27 and 18 to alkylator 17 while the heavy fraction boiling mostly above about 300° F. and comprising mainly acid-soluble olefinic organic compounds is withdrawn through line 28.

The lighter or hydrocarbon phase from acid settler 21 is passed through line 29 to primary fractionator 31. A low-boiling mixture of hydrofluoric acid and low-boiling paraffins, such as propane and isobutane, is passed overhead through line 32 and after being cooled in cooler 35 enters accumulator 34 as a liquid. In accumulator 34, the mixture separates into an acid and a hydrocarbon phase, and the acid phase is returned to acid settler 21 through line 36. The hydrocarbon phase is withdrawn from accumulator 34 through line 37 and a portion thereof is recycled to primary fractionator 31 through line 38 while the remainder is charged to depropanizer 41 through line 39. From the bottom of depropanizer 41 a stream, comprising mainly isobutane, is taken off through line 42 and recycled to alkylator 17. A mixture of hydrofluoric acid and propane is passed overhead from depropanizer 41 through line 43, and thereafter is passed by line 44 through cooler 46 into accumulator 47. In accumulator 47, the mixture separates into an acid and a hydrocarbon phase, the acid phase being returned to acid settler 21 through line 48. The hydrocarbon phase is withdrawn from accumulator 47 through line 49, and a portion thereof is recycled to depropanizer 41 through line 51 while the remainder is introduced into stripper 53 through line 52. From the bottom of stripper 53, a stream of propane is taken off through line 54 while the overhead, comprising a mixture of hydrofluoric acid and propane, is passed by means of lines 56 and 44 through cooler 46 into accumulator 47.

Referring again to primary fractionator 31, a fraction, comprising heavy and light alkylates, organic fluorine compounds, unreacted isobutane, and undesired low-boiling material, such as normal butane, is withdrawn from the bottom of said fractionator through line 61 by means of pump 62. Valve 63 actuated by level controller 64 controls the amount of alkylation products which are withdrawn from fractionator 31. From pump 62, the bottoms fraction is passed by means of lines 65 and 67 through heat exchanger 66 and heat exchanger 68 and thence by line 69 into soaking drum 71. Sufficient heat is supplied to heat exchanger 68 to maintain a liquid temperature within soaking drum 71 in the range of about 325 to about 550° F., and preferably between about 375 and about 475° F. In any event, it is a feature of this invention that the temperature in soaking drum 71 is maintained at least 50° F. higher than the liquid in the bottom of fractionator 31, i. e., the material leaving fractionator 31 through line 61. Heat exchanger 68 may be supplied with steam or Dowtherm through line 70 or a conventional tube furnace may be employed. Organic fluorine compounds are thermally decomposed to hydrocarbons and hydrofluoric acid by heating the bottoms fraction at an elevated temperature over a period of time. The necessary heat is supplied by heat exchanger 68 while the time required for the decomposition is provided for by using soaking drum 71. Heat exchanger 68 may be dispensed with, if desired, and a heating coil placed in soaking drum 71. The hydrofluoric acid produced by the thermal defluorination flows, together with vaporized light hydrocarbons, as a vapor from soaking drum 71 through line 72 to the bottom section of fractionator 31. This vapor flow is controlled so as to provide the required amount of reboiling heat to the fractionator 31 by utilizing temperature recorder controller 73 which actuates valve 74 so as to maintain a specified bubble tray temperature in fractionator 31. A temperature recorder controller 76 is also provided which actuates valve 77 to control the amount of heat supplied the bottom fraction in heat exchanger 68 in accordance with the desired liquid temperature within soaking drum 71. For instance, when a simple heat exchanger is utilized, valve 77 regulates the flow of steam, Dowtherm or other heat transfer fluid in line 70, and when heat exchanger 68 is a furnace, such as a tube furnace, valve 77 regulates the flow of fuel through line 70 to the furnace burners.

While temperature controller 76 is shown as being dependent upon the temperature within soaking drum 71, it alternately may be dependent upon the temperature in line 69 and set to operate valve 77 in accordance with the temperature of the liquid before entry into soaking drum 71. Furthermore instead of temperature controller 73, a flow controller may be utilized to operate valve 74 so as to maintain a predetermined rate of vapor flow into fractionator 31.

The defluorinated fraction, containing substantially no organic fluorine compounds, leaves soaking drum 71 through line 78 and passes through heat exchanger 66. In an indirect heat transfer, the defluorinated fraction gives up some of its heat to the bottom fraction entering and leaving heat exchanger 66 through lines 65 and 67, respectively, thus reducing the amount of heat which must be supplied by heat exchanger 68. Soaking drum 71 is provided with level controller 79 which actuates valve 81 to control the amount of liquid leaving soaking drum 71, and entering fractionator 82 through line 83. From fractionator 82, isobutane is taken overhead through line 84 and recycled to alkylator 17. The deisobutanized alkylate is withdrawn from the bottom of fractionator 82 by line 86 and passed through bauxite treater 87 for the removal of any traces of organic fluorine compounds which may not have been removed as a result of the thermal decomposition previously discussed. From bauxite treater 87, the alkylate is passed through line 88 to further process means, not shown, for the recovery of a light and a heavy alkylate fraction and the removal of undesired low-boiling material, such as normal butane and other material boiling above isobutane.

In the operation of primary fractionator 31, temperature controller 73 is set at the predetermined temperature which is desired at a specified point in the fractionator, such as a particular bubble tray. Temperature controller 76 is also set at the temperature at which it is desired to maintain the liquid within soaking drum 71, or in line 69, depending upon the location of the temperature sensing means. Sufficient vapors will leave soaking drum 71 to suply the reboiler heat to fractionator 31 in accordance with the setting of temperature controller 73. When the predetermined temperature of the specified bubble tray is exceeded, indicating an excess amount of reboiler heat being supplied, temperature controller 73 will actuate valve 74 to cut down the rate of vapor flow therethrough. Since the amount of vapors leaving soaking drum 71 is now lessened, the pressure therein is increased, and concurrently the temperature of the liquid within soaking drum 71 will increase. Temperature controller 76 in accordance with the increase in temperature actuates valve 77 to decrease the amount of heat supplied to heat exchanger 68. When the temperature of the specified bubble tray falls below a predetermined amount, the reverse of the above described operation takes place so as to allow a greater amount of reboiler heat to be supplied to fractionator 31.

When a flow controller is utilized instead of temperature controller 73, in essence the same result is achieved, but the controlling factor is a predetermined rate of flow into fractionator 31. When the rate of vapor flow into fractionator 31 falls below the predetermined level, the flow controller will actuate valve 74 so as to allow additional vapor to leave soaking drum 71. This operation will result in a decrease in temperature and pressure within soaking drum 71 so that temperature controller 76 will actuate valve 77 to increase the amount of heat supplied heat exchanger 68, thus raising the temperature of the liquid within soaking drum 71 and increasing the amount of vapor flowing to fractionator 31. When the rate of vapor flow exceeds a predetermined level, the flow controller operates valve 74 to decrease the flow of vapor therethrough, and concomitantly temperature controller 76 actuates valve 77 to decrease the amount of heat supplied heat exchanger 68.

In another modification of the present invention as illustrated in Figure 2, line 91 connecting lines 67 and 69 serves as a by-pass line around heat exchanger 68. Temperature controller 76 actuates valve 92 in line 91 to by-pass a part of the bottoms fraction before entry into heat exchanger 68, thus maintaining the liquid within soaking drum 71 at the desired temperature. When the liquid temperature falls below a predetermined level, temperature controller 76 actuates valve 92 to decrease the flow therethrough with the result that a greater amount of the bottoms fraction is heated within heat exchanger 68 before enry into soaking drum 71. When the liquid temperature rises above a predetermined level, the reverse of the above described operation takes place. While temperature controller 76 is shown as being dependent upon the temperature within soaking drum 71, it alternately may be dependent upon the temperature in line 69 and set to operate valve 92 in accordance with the temperature of the liquid before entry into soaking drum 71.

It is also within the contemplation of this invention to utilize a pressure controller responsive to the pressure in soaking drum 71 instead of temperature controller 76 to control the amount of heat imparted to the bottoms fraction, or the proportion of the bottoms fraction to be subjected to heating in heat exchanger 68. As previously discussed, the pressure within soaking drum 71 varies in accordance with the rate of vapor flow into fractionator 31, the pressure increasing as the flow decreases. Thus when the pressure within soaking drum 71 rises above a predetermined level, the pressure controller will operate to reduce the amount of heat supplied heat exchanger 68 or to increase the proportion of bottoms fraction by-passed directly to soaking drum 71 as the case may be. When the pressure within soaking drum 71 falls below a predetermined level, the pressure controller will work in a reverse manner to increase the amount of heat supplied heat exchanger 68 or to decrease the proportion of bottoms fraction by-passed through line 91.

Although this inveniton has been described in relation to an operation wherein the primary fractionator is a deisobutanizer, it is to be understood that said fractionator can also be a partial deisobutanizer, a partial or total depropanizer, or a debutanizer. And furthermore, while this invention has been related to the treatment of the alkylate fraction from the primary fractionator, it is within the contemplation of the invention to similarly defluorinate a fraction containing organic fluorine compounds recovered from any fractionator.

It will be understood that the flow diagram presented and described is schematic only, and that many additional pieces of equipment, such as valves, pumps, heat exchangers, flow meters, controllers, accumulators, fractionators, and the like may be employed and installed where deemed necessary by anyone skilled in the art. Many modifications and variations of this invention may obviously be used, and can be adapted by one skilled in the art without departing from the spirit of the disclosure.

I claim:

1. In a process for the conversion of hydrocarbons in the presence of a hydrofluoric acid catalyst, the steps which comprise introducing the effluent of such a conversion into a separating zone and therein separating liquid hydrofluoric acid from liquid hydrocarbons; passing said liquid hydrocarbons to a fractional distillation zone; separating from said distillation zone a vaporous fraction comprising hydrofluoric acid and low-boiling paraffinic hydrocarbons, and a liquid hydrocarbon fraction containing dissolved organic fluorine compounds; heating said liquid fraction for a period of time and to a temperature sufficient to decompose said organic fluorine compounds and form vapors containing vaporous hydrofluoric acid; recovering said liquid fraction essentially free of organic fluorine compounds and containing higher boiling paraffinic hydrocarbons; and passing said vapors containing vaporous hydrofluoric acid to said distillation zone at a rate and temperature sufficient to supply the reboiling heat.

2. In a process for the alkylation of a low-boiling isoparaffin with a low-boiling olefin in the presence of a hydrofluoric acid catalyst wherein the effluent of such an alkylation is separated into a hydrofluoric acid phase and a hydrocarbon phase, and said hydrocarbon phase is introduced into a fractional distillation zone for separation into a vaporous hydrofluoric acid fraction and a liquid hydrocarbon fraction, the improvement which comprises heating said liquid hydrocarbon fraction to a temperature sufficient to decompose the dissolved organic fluorine compounds and form vapors containing vaporous hydrofluoric acid; passing said vapors containing vaporous hydrofluoric acid to said fractional distillation zone to supply the reboiling heat to said zone; and recovering said liquid fraction essentially free of organic fluorine compounds and containing higher boiling paraffinic hydrocarbons.

3. In a continuous process for the alkylation of a low-boiling isoparaffin by reaction with a low-boiling olefin in the presence of a hydrofluoric acid catalyst, the improvement which comprises passing a low-boiling isoparaffin and a low-boiling olefin and a hydrofluoric acid catalyst to an alkylation zone; maintaining the mixture within said zone under alkylation reaction conditions; passing effluents of said alkylation zone to a separation zone and therein separating a liquid hydrocarbon phase from a liquid hydrofluoric acid phase; passing said hydrocarbon phase to a fractional distillation zone; separating from said distillation zone a vaporous fraction comprising hydrofluoric acid and low-boiling paraffinic hydrocarbons, and a liquid hydrocarbon fraction containing dissolved organic fluorine compounds; heating said liquid hydrocarbon fraction for a period of time and to a temperature sufficient to decompose said organic fluorine compounds and form vapors containing vaporous hydrofluoric acid; recovering said liquid fraction essentially free of organic fluorine compounds and containing higher boiling paraffinic hydrocarbons; and utilizing said vapors containing vaporous hydrofluoric acid to supply the reboiling heat to said fractional distillation zone.

4. In a process for the alkylation of a low-boiling isoparaffin with a low-boiling olefin in the presence of a hydrofluoric acid catalyst, the combination of steps which comprises introducing the effluent of such an alkylation into a separating zone and therein separating liquid hydrofluoric acid from liquid hydrocarbons; passing said liquid hydrocarbons to a fractional distillation zone; separating from said distillation zone a vaporous fraction comprising hydrofluoric acid and low-boiling paraffinic hydrocarbons, and a liquid hydrocarbon fraction containing dissolved organic fluorine compounds; heating said liquid hydrocarbon fraction to a temperature in the range of about 325 to about 550° F. so as to decompose said organic fluroine compounds and form vapors containing vaporous hydrofluoric acid; passing said vapors containing vaporous hydrofluoric acid to said distillation zone at a rate of flow sufficient to maintain said zone at a desired distillation temperature; and recovering said liquid hydrocarbon fraction essentially free of organic fluorine compounds and containing higher boiling paraffinic hydrocarbons.

5. The process of claim 4 wherein said liquid hydrocarbon fraction is heated to a temperature in the range of about 375 to about 475° F.

6. In a process for the alkylation of a low-boiling isoparaffin with a low-boiling olefin in the presence of a hydrofluoric acid catalyst, the combination of steps which comprises introducing the effluent of such an alkylation into a separating zone and therein separating liquid hydrofluoric acid from liquid hydrocarbons; passing said liquid hydrocarbons to a fractional distillation zone; separating from said distillation zone a vaporous fraction comprising hydrofluoric acid and low-boiling paraffinic hydrocarbons, and a liquid hydrocarbon fraction containing dissolved organic fluorine compounds; passing said liquid fraction consecutively through a first and a second heat exchange zone; controlling the amount of heat transferred within said second heat exchange zone so as to continually maintain said liquid fraction at a temperature in the range of about 325 to about 550° F.; removing from said liquid fraction decomposed organic fluorine compounds in the form of vapors containing vaporous hydrofluoric acid; passing said vapors containing vaporous hydrofluoric acid to said distillation zone at a rate of flow sufficient to maintain said zone at a desired distillation temperature; recovering said liquid fraction essentially free of organic fluorine compounds and containing higher boiling paraffinic hydrocarbons; and passing the recovered liquid fraction through said first heat exchange zone in an indirect heat exchange with said liquid hydrocarbon fraction.

7. The process of claim 6 wherein said liquid hydrocarbon fraction is heated to a temperature in the range of about 375 to about 475° F.

8. In a process for the alkylation of a low-boiling isoparaffin with a low-boiling olefin in the presence of a hydrofluoric acid catalyst, the combination of steps which comprises introducing the effluent of such an alkylation into a separating zone and therein separating liquid hydrofluoric acid from liquid hydrocarbons; passing said liquid hydrocarbons to a fractional distillation zone; separating from said distillation zone a vaporous fraction comprising hydrofluoric acid and low-boiling paraffinic hydrocarbons, and a liquid fraction containing dissolved organic fluorine compounds; passing said liquid fraction through a first heat exchange zone; controlling the proportion of said liquid fraction passed through a second heat exchange zone so as to continually maintain said liquid fraction at a temperature in the range of about 325 to about 550° F.; removing from said liquid fraction decomposed organic fluorine compounds in the form of vaporized light hydrocarbons and vaporous hydrofluoric acid; passing said vaporized light hydrocarbons and vaporous hydrofluoric acid to said fractional distillation zone at a rate of flow sufficient to maintain a desired distillation temperature; recovering said liquid fraction essentially free of organic fluorine compounds and containing higher boiling paraffinic hydrocarbons; and passing the recovered liquid fraction through said first heat exchange zone in an indirect heat exchange with said liquid hydrocarbon fraction.

9. The process of claim 8 wherein said liquid hydrocarbon fraction is heated to a temperature in the range of about 375 to about 475° F.

10. In a continuous process for the alkylation of a low-boiling isoparaffin by reaction with a low-boiling olefin in the presence of a hydrofluoric acid catalyst, the improvement which comprises passing a low-boiling isoparaffin and a low-boiling olefin and a hydrofluoric acid catalyst to an alkylation zone; maintaining the mixture within said zone under alkylation reaction conditions; passing effluents of said alkylation zone to a separation zone and therein separating a liquid hydrocarbon phase from a liquid hydrofluoric acid phase; passing said hydrocarbon phase to a first fractional distillation zone; separating from said first distillation zone a vaporous fraction comprising hydrofluoric acid and low-boiling paraffinic hydrocarbons, and a liquid fraction comprising higher boiling paraffinic hydrocarbons, organic fluorine compounds, and an unreacted low-boiling isoparaffin; heating said liquid fraction for a period of time and to a temperature sufficient to decompose said organic fluorine compounds and form vapors containing vaporous hydrofluoric acid; utilizing said vapors containing vaporous hydrofluoric acid to supply the reboiling heat to said first fractional distillation zone; passing the substantially defluorinated liquid fraction to a second fractional distillation zone; separating from said second distillation zone a vaporous fraction comprising an unreacted low-boiling isoparaffin and a liquid fraction comprising substantially defluorinated higher boiling paraffinic hydrocarbons; and contacting said latter liquid fraction with bauxite to remove therefrom any trace of organic fluorine compounds.

11. In a continuous process for the alkylation of a low-boiling isoparaffin by reaction with a low-boiling olefin in the presence of a hydrofluoric acid catalyst, the improvement which comprises passing a low-boiling isoparaffin and a low-boiling olefin and a hydrofluoric acid catalyst to an alkylation zone; maintaining the mixture within said zone under alkylation reaction conditions; passing effluents of said alkylation zone to a separation zone and therein separating a liquid hydrocarbon phase from a liquid hydrofluoric acid phase; passing said hydrocarbon phase to a first fractional distillation zone; separating from said first distillation zone a vaporous fraction comprising hydrofluoric acid and low-boiling paraffinic hydrocarbons, and a liquid fraction comprising higher boiling paraffinic hydrocarbons, organic fluorine compounds and an unreacted low-boiling isoparaffin; cooling and condensing said vaporous fraction and then separating the resulting liquid into a hydrofluoric acid phase and a hydrocarbon phase; returning said latter hydrofluoric acid phase to said separation zone; returning a portion of said latter hydrocarbon phase to said first distillation zone and passing the remainder of said hydrocarbon phase to a second fractional distillation zone; recovering from said second distillation zone a low-boiling paraffinic hydrocarbon; heating said liquid fraction for a period of time and to a temperature sufficient to decompose said organic fluorine compounds and form vaporized light hydrocarbons and vaporous hydrofluoric acid; passing said vaporized light hydrocarbons and vaporous hydrofluoric acid to said first distillation zone to supply the reboiling heat; passing the substantially defluorinated liquid fraction to a third fractional distillation zone, separating from said third distillation zone a vaporous fraction comprising an unreacted low-boiling isoparaffin and a liquid fraction comprising substantially defluorinated higher boiling paraffinic hydrocarbons; and contacting said latter liquid fraction with bauxite to remove therefrom any trace of organic fluorine compounds.

References Cited in the file of this patent

UNITED STATES PATENTS

| | | |
|---|---|---|
| 2,412,863 | Bolinger et al. | Dec. 17, 1946 |
| 2,417,669 | Vinyard | Mar. 18, 1947 |
| 2,425,745 | Leonard et al. | Aug. 19, 1947 |
| 2,531,112 | Dauphine | Nov. 21, 1950 |